(12) United States Patent
Swales et al.

(10) Patent No.: US 8,768,547 B2
(45) Date of Patent: Jul. 1, 2014

(54) CONTROL OF A HYBRID VEHICLE WITH A MANUAL TRANSMISSION

(75) Inventors: Shawn H. Swales, Canton, MI (US); Hong Yang, Rochester Hills, MI (US); Joel M. Maguire, Northville, MI (US); Donald L. Dusenberry, Farmington Hills, MI (US); Craig S. Ross, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 807 days.

(21) Appl. No.: 12/964,310

(22) Filed: Dec. 9, 2010

(65) Prior Publication Data

US 2012/0150371 A1    Jun. 14, 2012

(51) Int. Cl.
 *B60L 9/00* (2006.01)
(52) U.S. Cl.
 USPC .......................................................... 701/22

(58) Field of Classification Search
 None
 See application file for complete search history.

(56) References Cited

U.S. PATENT DOCUMENTS

| | | | |
|---|---|---|---|
| 6,962,135 B2* | 11/2005 | Kahlon et al. | 123/179.3 |
| 2003/0140880 A1* | 7/2003 | Kahlon et al. | 123/179.3 |
| 2007/0099757 A1* | 5/2007 | Landes | 477/175 |

* cited by examiner

*Primary Examiner* — Thomas Tarcza
*Assistant Examiner* — Adam Alharbi
(74) *Attorney, Agent, or Firm* — Quinn Law Group, PLLC

(57) ABSTRACT

A vehicle includes a transmission that receives torque from an engine and/or a motor. A clutch assembly that may be actuated by a driver is operably disposed between the transmission and the motor, the engine, or both. A controller is configured to control the torque provided by the motor and the engine to prevent engine stall, excessive engine flare, or both, during manual actuation of the clutch assembly by the driver of the vehicle.

18 Claims, 4 Drawing Sheets

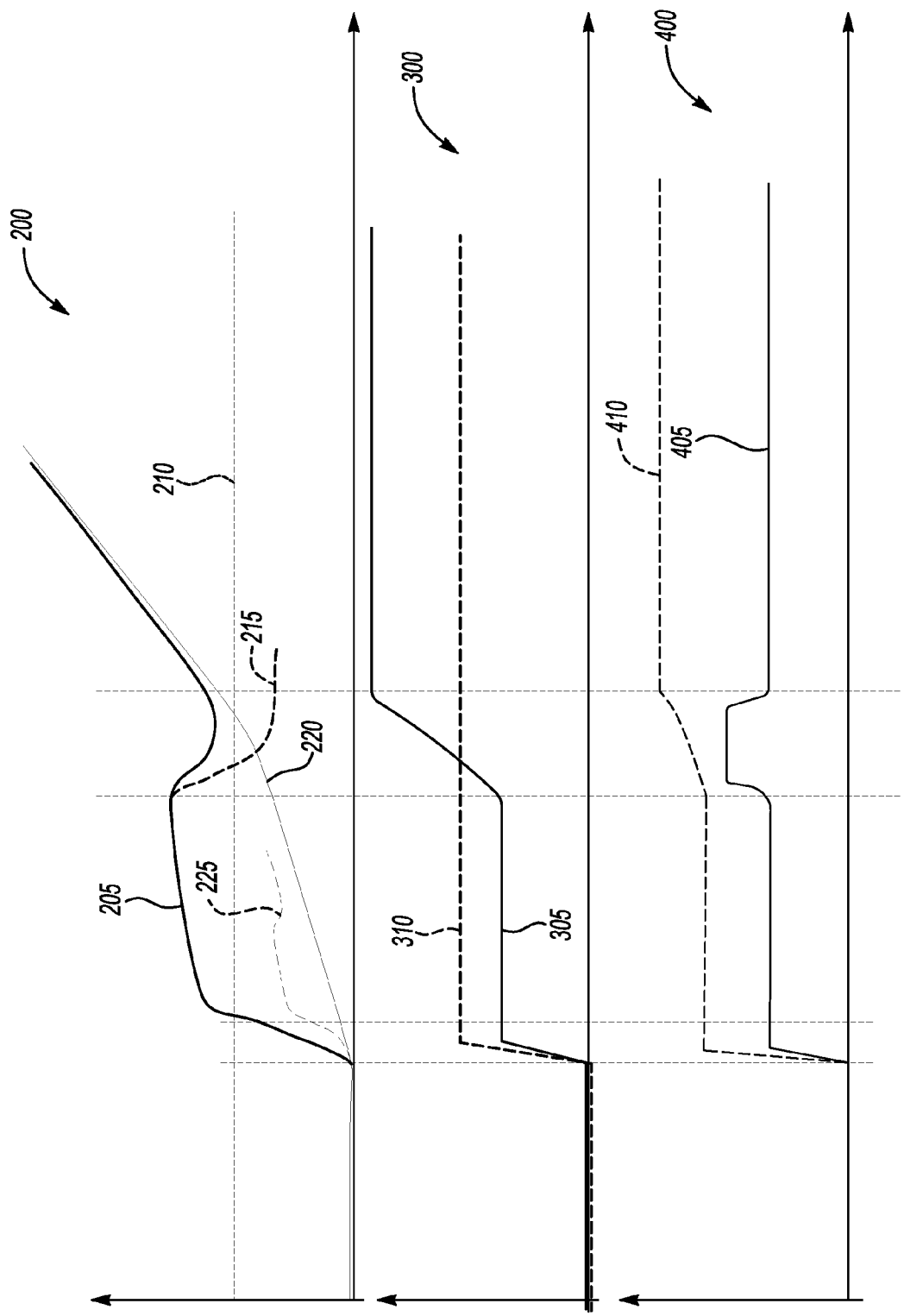

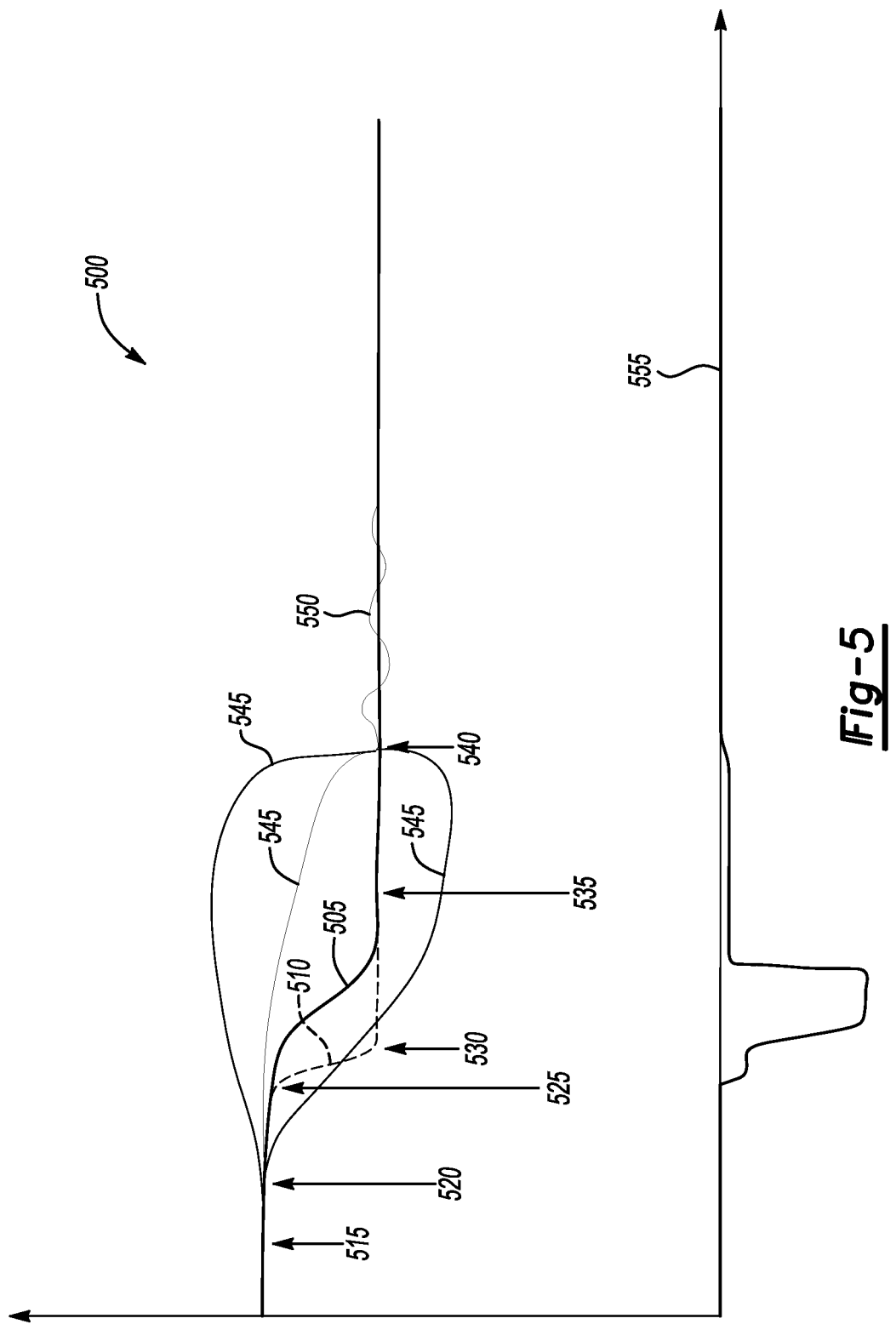

CONTROL OF A HYBRID VEHICLE WITH A MANUAL TRANSMISSION

TECHNICAL FIELD

The invention relates to control of a hybrid vehicle with a manual transmission.

BACKGROUND

Passenger and commercial vehicles, including hybrid vehicles, are equipped with a powertrain system that provides torque to wheels of the vehicle. Hybrid vehicles typically use an automatic transmission, which may give the driver little control over the torque transferred between the engine and/or motor and the transmission.

SUMMARY

A vehicle includes a transmission, an engine, and a motor. The engine and the motor are both configured to provide a torque to the transmission. A clutch assembly is operably disposed between the transmission and at least one of the motor and the engine. The clutch assembly is configured to be manually actuated by a driver of the vehicle. A controller is configured to control the torque provided by the motor and the engine to prevent engine stall, excessive engine flare, or both, during the manual actuation of the clutch assembly by the driver of the vehicle.

A method of preventing engine stall, excessive engine flare, or both, in a vehicle includes receiving a vehicle speed, a position of an accelerator pedal, and a gear selection. The method further includes determining a desired crankshaft torque from at least one of the vehicle speed, the position of the accelerator pedal, and the gear selection. The desired crankshaft torque is sufficient to prevent engine stall during manual actuation of a clutch assembly by a driver of the vehicle. The method further includes commanding each of an engine and a motor to provide at least a portion of the desired crankshaft torque during the manual actuation of the clutch assembly by the driver.

The vehicle and method described herein may give a driver some control over the transfer of torque between the engine and the transmission while improving the driving experience and increasing fuel efficiency.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 illustrates an example graph of the speeds of various vehicle components over time.

FIG. 3 illustrates an example graph of clutch capacity and accelerator pedal position over time.

FIG. 4 illustrates an example graph of various torques over time.

FIG. 5 illustrates an example graph of the speeds of various vehicle components at different times.

DETAILED DESCRIPTION

A hybrid vehicle with a manual transmission gives a driver some control over the transfer of torque between the engine and the transmission while improving the driving experience and increasing fuel economy. The vehicle may further include an engine and a motor. The engine, the motor, or both, may be configured to provide torque to the transmission. A clutch assembly is operably disposed between the transmission and the engine and/or motor to transfer torque to the transmission. The clutch assembly is configured to be manually actuated by the driver of the vehicle. A controller is configured to control the torque provided by the motor and the engine to prevent engine stall, excessive engine flare, or both, during the manual actuation of the clutch assembly by the driver.

Figure 1:
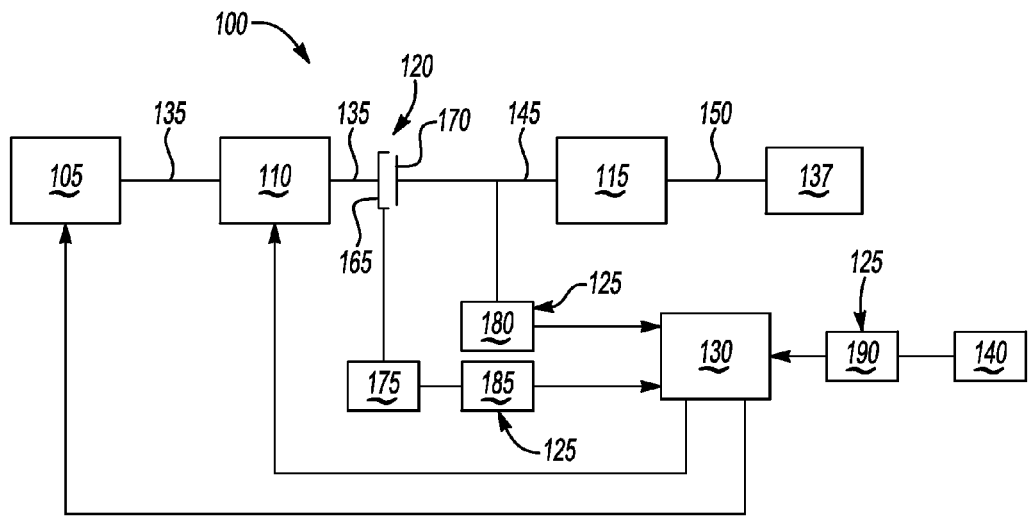
FIG. 1 is a schematic diagram of an example hybrid vehicle.

FIG. 1 illustrates a hybrid vehicle 100 with a manual transmission. The vehicle 100 may take many different forms and include multiple and/or alternate components and facilities. While an example vehicle 100 is shown in the Figures, the components illustrated in the Figures are not intended to be limiting. Indeed, additional or alternative components and/or implementations may be used.

The vehicle 100 may include an engine 105, a motor 110, a transmission 115, a clutch assembly 120, a plurality of sensors 125, and a controller 130. The vehicle 100 may be any passenger or commercial automobile. Further, various features of the vehicle 100 as disclosed herein may be implemented in a hybrid electric vehicle including a plug-in hybrid electric vehicle (PHEV) or an extended range electric vehicle (EREV), a gas-powered vehicle, or the like.

The engine 105 may include any device configured to generate a torque and provide the torque to the transmission 115. In one implementation, the engine 105 may be configured to output the torque via a crankshaft 135. The engine 105 may include an internal combustion engine 105 configured to burn a fuel to generate the torque. Accordingly, the engine 105 may receive fuel from a fuel tank (not shown) disposed on the vehicle 100. The operation of the engine 105 may be controlled by an engine control unit (not shown). The rotational speed of the engine 105 may be partially controlled by a driver of the vehicle 100. For instance, an accelerator pedal 140 may be located in a passenger compartment of the vehicle 100. The driver may actuate the accelerator pedal 140 to cause a throttle (not shown) to open, which may allow fuel to enter the engine 105. The accelerator pedal 140 may cause the throttle to open directly using, for example, a cable or indirectly via an electronic signal.

The motor 110 may include any device configured to generate torque and provide additional torque to the crankshaft 135 by converting electrical energy into rotational motion. As such, the motor 110 may receive electrical energy from a power source (not shown), such as a battery. Both the engine 105 and motor 110 may be configured to cause the crankshaft 135 to rotate to provide torque to the transmission 115. Thus, the motor 110 and the engine 105 may be operably connected in a way that allows both the motor 110 and the engine 105 to provide torque to the crankshaft 135. In one possible implementation, the motor 110 may be configured to start the engine 105 and supplement the torque provided by the engine 105 to the transmission 115 via the crankshaft 135. This way, the engine 105 may be turned off when travelling at low speeds or when coasting and restarted quickly when needed to increase fuel efficiency. Further, the motor 110 may be configured to act as a generator. For instance, the motor 110 may be configured to generate electrical energy and store the electrical energy in the power source. The vehicle 100 may include any number of motors 110.

The transmission 115 may include any device configured to convert the torque received from the engine 105 and/or motor 110 via the crankshaft 135 and output the torque to rotate the wheels 137 of the vehicle 100. The transmission 115 may include an input shaft 145, an output shaft 150, and a gearbox (not shown). The input shaft 145 may be configured to receive torque from the engine 105 and/or motor 110 via, for example, the crankshaft 135. The output shaft 150 may be configured to rotate to provide torque to the wheels 137. The gearbox may be operatively disposed between the input shaft 145 and the output shaft 150 to convert the torque provided to the input shaft 145 to a different torque. As such, the gearbox may include one or more gear sets that convert the engine 105 and/or motor torque to the torque provided to the wheels 137. The gear sets in the gearbox may be selected by a driver of the vehicle 100 using a gear shifter 160 located in a passenger compartment of the vehicle 100. In one possible implementation, the transmission 115 is a manual transmission that allows the driver to select among various forward drive gears and one or more reverse gears. The transmission 115 may include one or more hydraulic components (not shown) that actuate to engage various gears within the transmission 115.

The clutch assembly 120 may include any device configured to transfer torque from the engine 105 and/or motor 110 and the transmission 115. The clutch assembly 120 may include a driving mechanism 165 and a driven mechanism 170. The driving mechanism 165 may be operatively disposed on the crankshaft 135 and rotate at the same speed as the crankshaft 135. As such, the rotational speed of the driving mechanism 165 may be based on the rotational speeds of the engine 105 and/or motor 110. The driven mechanism 170 may be operatively disposed on the input shaft 145 of the transmission 115. Accordingly, the input shaft 145 may rotate at the same speed as the driven mechanism 170. When fully engaged, the driving mechanism 165 and the driven mechanism 170 may be configured to rotate at the same speed. When fully disengaged, the driving mechanism 165 and the driven mechanism 170 are free to rotate at different speeds. The clutch assembly 120 may be partially engaged. When partially engaged, some torque from the driving mechanism 165 may be transferred to the driven mechanism 170. In one possible implementation, the clutch assembly 120 may be manually actuated by the driver of the vehicle 100. That is, a clutch pedal 175 that may be disposed in the passenger compartment of the vehicle 100 may be operatively connected to the clutch assembly 120. The clutch assembly 120 may be configured to be normally engaged (e.g., engaged when the clutch pedal 175 is released) and disengage when the driver presses the clutch pedal 175. Accordingly, the actuation of the clutch pedal 175 may cause the clutch assembly 120 to engage, disengage, or partially engage.

The plurality of sensors 125 may include an input shaft sensor 180, a clutch pedal sensor 185, and an accelerator pedal sensor 190. The input shaft sensor 180 may be operatively disposed on or near the input shaft 145 and may include any device configured to measure the rotational speed of the input shaft 145 and output a signal representative of the input shaft speed. The clutch pedal sensor 185 may be operatively disposed on or near the clutch pedal 175 and may include any device configured to determine a position of the clutch pedal 175 and output a signal representative of the clutch pedal 175 position. The accelerator pedal sensor 190 may be operatively disposed on or near the accelerator pedal 140 and may include any device configured to determine a position of the accelerator pedal 140 and output a signal representative of the accelerator pedal position. In one possible approach, one or more of the input shaft sensor 180, the clutch pedal sensor 185, and the accelerator pedal sensor 190 may include an encoder or a resolver.

The controller 130 may include any device configured to control various aspects of the vehicle 100. For instance, the controller 130 may be configured to control the torque provided by the engine 105 and/or motor 110 to prevent engine stall during actuation of the clutch assembly 120. Engine stall may occur if the clutch assembly 120 is engaged or disengaged too quickly so the controller 130 may be configured to control the torque on the crankshaft 135 provided by the motor 110 to prevent engine stall. In one possible approach, the controller 130 may control the engine 105 to rotate at a speed above a predetermined stall speed (e.g., a speed at which the engine 105 may operate without stalling). That is, the controller 130 may be programmed with the predetermined stall speed and control the engine 105 to rotate at a speed above the predetermined stall speed when the engine 105 has a load. However, to prevent the speed of the engine 105 from falling below the predetermined stall speed, the controller 130 may be further configured to control the motor 110 to provide additional torque to the crankshaft 135 during, for example, actuation of the clutch assembly 120. This additional torque may reduce the load on the engine 105 and prevent the engine 105 from stalling. The predetermined stall speed may change as driving conditions change. For instance, the predetermined stall speed may be based on the load on the engine 105, which may change depending on driving conditions (e.g., whether the clutch assembly 120 is engaged).

The controller 130 may be configured to receive the signals generated by one or more of the input shaft sensor 180, the clutch pedal sensor 185, and the accelerator pedal sensor 190 and control components of the vehicle 100 based on the signals received. In one possible approach, the controller 130 may be configured to identify a driver request based on the actuation of the accelerator pedal 140. The controller 130 may, for example, be configured to receive the signal representing the position of the accelerator pedal 140 from the accelerator pedal sensor 190 and determine the driver request from that signal. To fulfill the driver request, the controller 130 may control a speed of the engine 105 and/or motor 110 to provide the torque based on the amount of actuation of the accelerator pedal 140. The controller 130 may be further configured to determine the driver request based upon the position of the clutch pedal 175 as identified by the clutch pedal sensor 185. For instance, when the clutch pedal 175 is pressed, the driver intends for no torque to be transferred from the engine 105 and/or motor 110 to the transmission 115.

Also, the controller 130 may be configured to receive the input shaft speed from the input shaft sensor 180. The controller 130 may use the input shaft speed to control the engine 105 when, for example, the clutch assembly 120 is at least partially engaged. That is, the driver request based on the amount that the accelerator pedal 140 is depressed may represent the amount of torque the driver wants provided to the transmission 115. The speed of the input shaft 145 may be used to estimate the amount of torque transferred to the input shaft 145 via the clutch assembly 120. Therefore, the controller 130 may monitor the input shaft speed to ensure that the rotational speed of the crankshaft 135 provided by the engine 105 and/or motor 110 torque meets the driver request. If not, the controller 130 may be configured to increase the speed of the engine 105 and/or motor 110 to increase the amount of torque provided to the crankshaft 135 and input shaft 145. Moreover, the controller 130 may be configured to determine an upshift (e.g., when the driver shifts the transmission 115 into a higher gear) and a downshift (e.g., when the driver shifts the transmission 115 into a lower gear) based on changes in the input shaft speed relative to the speed of the vehicle 100.

In one possible implementation, the controller 130 may be configured to control the engine 105 to maintain a speed that reduces slip in the clutch assembly 120 during, for example, engagement of the clutch assembly 120. Using the input shaft speed, the controller 130 may synchronize the rotational speed of the crankshaft 135 to substantially match the speed of the input shaft 145. This way, the clutch assembly 120 will experience less slip during engagement, resulting in increased fuel efficiency. Further, engaging the clutch when the engine 105 and the transmission 115 are substantially synchronized may reduce an excess torque being transmitted to the wheels 137, which may result in an unpleasant driving feel. The controller 130 may be further configured to control the engine 105 to reduce engine flare. Among other situations, engine flare may occur when the driver briefly presses the accelerator pedal 140 to launch the vehicle 100 (e.g., tip-in) prior to causing the clutch assembly 120 to at least partially engage. As a result of the tip-in, the rotational speed of the engine 105 may rapidly increase and decrease, which may use excess fuel. Accordingly, the controller 130 may be configured to recognize a situation that may cause engine flare (e.g., tip-in) and control the speed of the engine 105 to reduce the engine flare despite the manner in which the driver presses the accelerator pedal 140.

In general, computing systems and/or devices, such as the controller 130, may employ any of a number of computer operating systems and generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission 115 media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

FIG. 2 illustrates an example graph 200 of the engine speed and speed of the input shaft 145 at various times. The x-axis (e.g., the horizontal axis) may represent time and the y-axis (e.g., the vertical axis) may represent speed. Line 205 may represent the engine speed. At launch, the engine speed 205 may increase at least until the engine speed 205 exceeds the stall speed 210. When the clutch assembly 120 begins to engage (e.g., as the driver begins to release the clutch pedal 175), the engine speed 205 may drop slightly due the load of the partially engaged clutch. The controller 130, however, may prevent the engine speed 205 from dropping below the stall speed 210 to prevent the engine 105 from stalling. For instance, the controller 130 may direct the motor 110 to provide torque to the crankshaft 135, which reduces the load on the engine and helps to prevent the engine speed 205 from falling below the stall speed 210. The dashed line 215 may represent the engine speed if the controller 130 did not provide additional torque to assist the engine 105. As illustrated, the dashed line 215 falls below the stall speed 210, which means that the engine 105 may otherwise stall without torque assistance. With the torque assistance from the controller 130 and the motor 110, prior to the clutch assembly 120 becoming fully engaged, the engine speed 205 may begin to rise. The line 220 may represent the rotational speed of the input shaft 145 (e.g., input speed) via torque from the engine 105, the motor 110, or both. The controller 130 may control the engine speed 205 to substantially match the input speed 205 prior to the clutch becoming fully engaged. The dashed line 225 may represent the speed of the motor 110 during an engine 105 off launch. Accordingly, the motor 110 may provide some torque to the input shaft 145 when, for instance, the vehicle 100 is travelling at low speeds.

FIG. 3 illustrates an example graph 300 of clutch capacity 305 and accelerator pedal position 310 over time. The x-axis (e.g., the horizontal axis) may represent time and the y-axis (e.g., the vertical axis) may represent clutch capacity 305 and/or accelerator pedal position 310. At launch, the driver may press and hold the accelerator pedal 140 in a position. Simultaneously, the driver may command, via the clutch pedal, a certain level of torque transfer to the input shaft 145 to launch the vehicle 100. At a later time, the driver may release the clutch pedal further, increasing the torque transferred to the input shaft 145. In response, the controller 130 may supplement the engine torque with motor torque to avoid the engine speed dropping too low, as shown in FIG. 2.

FIG. 4 illustrates an example graph 400 of the crankshaft torque 405 and output torque 410, represented on the y-axis (e.g., the vertical axis), over time, which is represented on the x-axis (e.g., the horizontal axis). For instance, at launch, both the crankshaft torque 405 and the output torque 410 may rise since the clutch assembly 120 is at least partially engaged as illustrated in FIG. 3. As the driver releases the clutch pedal 175, the clutch assembly 120 may begin to engage, causing the output torque 410 to increase or decrease depending on the gear selection of the driver. As illustrated, the output torque 410 may increase due to the partial engagement of the clutch assembly 120. Once the clutch is fully engaged (e.g., the clutch pedal 175 is released), the output torque 410 may remain substantially the same until the clutch pedal 175 is pressed to at least partially disengage the clutch assembly 120.

The crankshaft torque 405 may at least partially depend upon the position of the accelerator pedal 140 illustrated in FIG. 3. Additionally, during engagement of the clutch assembly 120, the controller 130 may cause the crankshaft torque 405 to increase briefly to prevent the engine 105 from stalling. For instance, the controller 130 may cause the motor 110 to provide additional torque to the crankshaft 135 while the clutch assembly 120 is at least partially engaged. Although not illustrated in FIG. 4, the controller 130 may control the engine 105 or motor 110 to reduce the crankshaft torque 405 to prevent the engine 105 from exceeding a flare limit (e.g., a maximum engine speed).

FIG. 5 illustrates an example graph 500 of engine speed and input shaft speed during an example upshift sequence. Line 505 may represent the example engine speed and line 510 may represent an example input speed (e.g., speed of the input shaft 145). At point 515, the clutch assembly 120 may be disengaged so that the engine 105 does not provide torque to the input shaft 145. The clutch assembly 120 may become disengaged when the driver presses the clutch pedal 175. At point 520, a dog clutch within the transmission 115 may be released. At point 525, a synchronizer may be used to synchronize the speed 510 of the input shaft 145 in the new gear state commanded by the driver, prior to engaging the clutch assembly 120. For instance, the synchronizer may cause the input speed 510 to drop and the controller 130 may gradually slow the engine speed 505. When the engine speed 505 and the input speed 510 are substantially the same, the clutch assembly 120 may be engaged as illustrated at point 535 or point 540. Lines 545 illustrate example engine speeds if the engine 105 does not receive synchronization help from the controller 130. As illustrated, the engine speeds 545 are substantially different than the input speed 510, which may result in an unpleasant driving experience when the clutch assembly 120 is engaged at point 540. Further, the clutch assembly 120 may be engaged earlier than point 540 (e.g., at point 535) if the controller 130 synchronizes the engine speed 505 and the input speed 510. Poor synchronization may also result in some ringing, as illustrated by line 550. Line 555 may represent the torque on the motor 110. For instance, the torque may become negative at point 525. Based on data from the input speed sensor, at point 525 the controller 130 may determine whether the driver is planning an upshift or a downshift, though the specific gear state to be selected may not be known. In the example shown, the shift is an upshift. In this case the controller 130 may recognize that the engine speed at synchronization is lower than before synchronization and request a negative crankshaft torque to change the engine speed in the proper direction. At point 530, the input shaft 145 has been fully synchronized in the new gear state, and the controller 130 may determine the desired engine speed. Further, the controller 130 may command a larger negative torque to change the engine speed more rapidly to the proper speed for synchronization, as indicated by line 555. During this time, the controller 130 may be configured to deliver this negative crankshaft torque to the engine 105 primarily using the torque generated by the motor 110 and thus, for example, convert a portion of the kinetic energy of the engine 105 as it decelerates into useful battery energy. This example use of the motor 110 may also avoid the need to change the spark timing in the engine 105, in an example implementation where the engine 105 is a spark-ignited engine, away from the spark timing used for best efficiency. Maintaining the spark timing during this event allows the engine 105 to continue running as efficiently as possible, reducing the fuel consumption of the engine 105. Operation of the system during an upshift is similar except that the controller 130 may be configured to command a positive crankshaft torque to aid in synchronization in the new gear state. The reduction in potential shift time by earlier and more precise synchronization may be perceived by the driver over time resulting in a more pleasant and fuel efficient driving experience.

Figure 6:
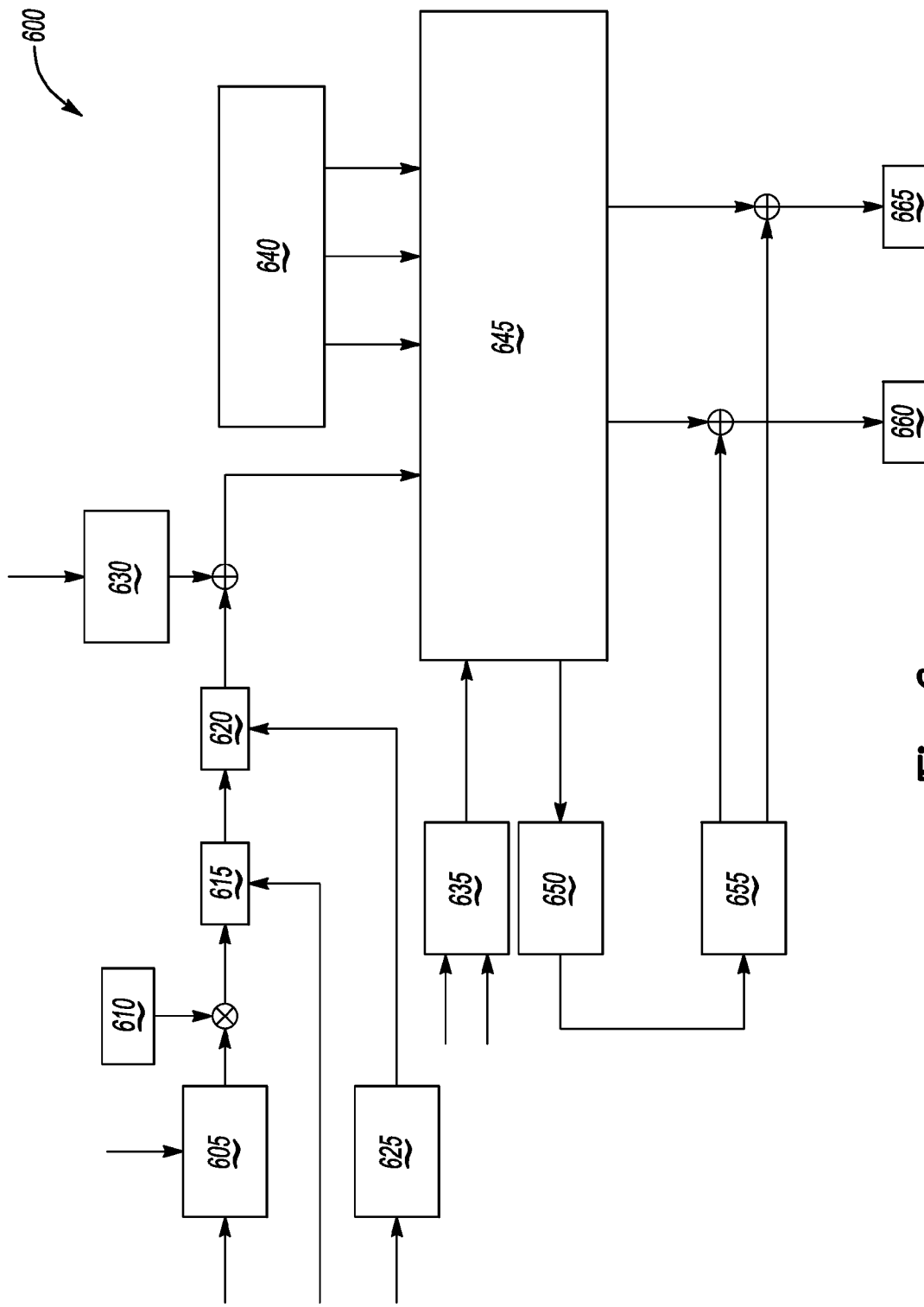
FIG. 6 illustrates an example control schematic that may be implemented by the controller of the hybrid vehicle.

FIG. 6 illustrates an example control architecture 600 that may be implemented by the controller 130.

At block 605, the controller 130 may receive the vehicle speed and the accelerator pedal position and determine a vehicle acceleration request from the vehicle speed and the accelerator pedal position. The vehicle speed may be measured by a sensor (not shown) or derived from the selected gear and engine speed, and the accelerator pedal position may be measured by the accelerator pedal sensor 190.

At block 610, the controller 130 may determine a vehicle mass. For instance, the controller 130 may be programmed with an estimated vehicle mass that may be adjusted based on a number of passengers in the vehicle 100. The controller 130 may use the vehicle acceleration request and the mass of the vehicle 100 to generate an axle torque request.

At block 615, the controller 130 may receive the axle torque request and apply a ratio to the axle torque request based on, for example, the driver's gear selection. The controller 130 may output a crankshaft torque request based on the axle torque request and the gear selection.

At block 620, the controller 130 may compare the crankshaft torque request to a minimum torque request based on the position of the clutch pedal 175. For example, the controller 130 may estimate the clutch capacity at block 625 based on the position of the clutch pedal 175 and output an intended crankshaft torque to block 620. The controller 130 may generate a crankshaft torque command based, at least in part, on the crankshaft torque request and the intended crankshaft torque.

At block 630, the controller 130 may receive the accelerator pedal position and apply an engine speed profile based on the accelerator pedal position. The engine speed profile may further be used to generate the crankshaft torque command.

At block 635, the controller 130 may estimate a gear state based on a speed of the input shaft 145 and a speed of the output shaft 150. For instance, the controller 130 may be programmed with gear ratios for each selectable gear state. Therefore, the controller 130 may identify the gear state if the ratio of the speed of the input shaft 145 to the output shaft 150 is substantially equal to one of those gear ratios.

At block 640, the controller 130 may access various vehicle constraints. For instance, the vehicle constraints may include an anti-flare speed limit (e.g., the maximum engine speed during a tip-in), an anti-stall speed limit (e.g., the predetermined stall speed), torque and speed limits of the motor, torque and speed limits of the engine 105, and a battery power limit. These limits may be constant or may vary based on a variety of inputs, such as outside ambient temperature; the temperature of various components including the engine 105, transmission 115, clutch 120, motor 110, battery, etc.; a driver-selectable switch such as a "sport," "winter," or "eco" switch; the value of the accelerator pedal input and/or its rate of change; and a hybrid battery state of charge.

At block 645, the controller 130 may determine the desired engine torque and the desired motor torque based, at least in part, on the crankshaft torque command determined from blocks 620 and 630, the gear determined at block 635, and the vehicle constraints at block 640. The controller 130 may further consider the speed of the vehicle 100, the desired gear, and state of charge when determining the desired engine torque and the desired motor torque.

At block 650, the controller 130 may apply an engine speed profile to generate an engine speed command, which may be provided to block 655. At block 655, the controller 130 may apply a closed-loop engine speed control to generate a closed loop engine torque signal and a closed loop motor torque signal. The controller 130 may use the closed loop engine torque signal and the desired engine torque to generate the engine torque command at block 660. The controller 130 may output the engine torque command to the engine control unit (not shown) to control the engine 105 to provide the torque determined at block 660. The controller 130 may use the closed loop motor torque signal and the desired motor torque to generate the motor torque command at block 665. The controller 130 may output the motor torque command to the motor control unit (not shown) to control the motor 110 to provide the torque determined at block 665.

Figure 7:
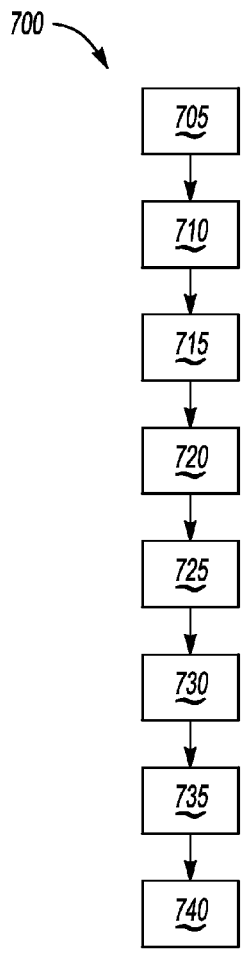
FIG. 7 illustrates a flowchart of an example process that may be implemented by the controller of the hybrid vehicle.

FIG. 7 illustrates a flowchart of an example process 700 that may be implemented by the controller 130.

At block 705, the controller 130 may receive the vehicle speed from, for example, a vehicle speed sensor (not shown) that may be operatively disposed on or near the wheels 137 or an axle of the vehicle 100. Alternatively, the vehicle speed may be derived from the engine speed and the selected gear.

At block 710, the controller 130 may receive the accelerator pedal position from, for instance, the accelerator pedal sensor 190.

At block 715, the controller 130 may receive the gear selection. The driver may select a gear using a gear shifter 160 and the controller 130 may identify the selected gear based on the position of the gear shifter 160. Alternatively, the controller 130 may derive the selected gear based on the speed of the input shaft 145, the speed of the output shaft 150, and the gear ratio for each selectable gear.

At block 720, the controller 130 may receive the clutch pedal position as determined, for example, from the clutch pedal sensor 185. The clutch pedal position may indicate the amount of engagement of the clutch assembly 120. Thus, the controller 130 may determine the amount of torque transferred to the input shaft 145 from the engine 105 based on the clutch pedal sensor 185. Alternatively, the controller 130 may derive the clutch pedal 175 position based on the engine speed and the speed of the input shaft 145.

At block 725, the controller 130 may determine the desired crankshaft torque. For instance, the controller 130 may use the vehicle speed, the position of the accelerator pedal 140, the position of the clutch pedal 175, and the selected gear to determine the driver's intended crankshaft torque, which may be used to determine the desired crankshaft torque. In one possible implementation, the controller 130 may be configured to determine the desired crankshaft torque to be at least the driver's intended crankshaft torque.

At block 730, the controller 130 may apply vehicle constraints to the intended crankshaft torque. The vehicle constraints may include the anti-flare speed limit (e.g., the maximum engine speed that may occur as a result of a tip-in), the anti-stall speed limit (e.g., the predetermined stall speed), the torque and speed limits of the motor 110, the torque and speed limits of the engine 105, and the battery power limit.

At block 735, the controller 130 may determine the desired engine and motor torques and generate the engine and motor torque commands. For instance, the engine and motor torque commands may be based on at least the desired crankshaft torque and the vehicle constraints. The controller 130 may further consider the current gear and the closed loop engine and motor torques when generating the engine and motor torque commands.

At block 740, the controller 130 may command the engine 105 and motor 110 to provide at least a portion of the desired crankshaft torque during, for example, actuation of the clutch assembly 120 by the driver. The controller 130 may output the engine torque command to the engine control unit and the motor torque command to the motor control unit. In response, the engine 105 and motor 110 may provide the commanded torques during actuation of the clutch assembly 120. Accordingly, the crankshaft torque is sufficient to prevent engine stall during actuation of the clutch assembly 120.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   a transmission having an input shaft;
   an engine having a crankshaft, wherein the engine is configured to provide an engine torque via the crankshaft to the input shaft of the transmission;
   a motor configured to provide a motor torque to the input shaft of the transmission;
   a clutch pedal having a clutch pedal position;
   a clutch assembly operably disposed between the transmission and at least one of the motor and the engine, wherein the clutch assembly is configured to be manually actuated by a driver of the vehicle via the clutch pedal;
   a clutch pedal position sensor configured to determine the clutch pedal position; and
   a controller in communication with the clutch pedal position sensor that is configured to detect an engagement of the clutch assembly using the determined clutch pedal position, control the torques provided by the motor and the engine to synchronize a rotational speed of the crankshaft with a rotational speed of the input shaft and thereby reduce slip across the clutch assembly during the engagement of the clutch assembly, and prevent at least one of engine stall and engine flare during the manual actuation of the clutch assembly.

2. A vehicle as set forth in claim 1, further comprising an accelerator pedal configured to be actuated by the driver, and wherein the controller is configured to control the engine speed based on the actuation of the accelerator pedal.

3. A vehicle as set forth in claim 2, wherein the controller is configured to identify a driver request based on the actuation of the accelerator pedal and control a speed of the engine at least partially based on the driver request.

4. A vehicle as set forth in claim 1, wherein the controller is configured to prevent the engine stall during the manual actuation of the clutch assembly by controlling the engine to maintain a speed of the engine above a predetermined stall speed.

5. A vehicle as set forth in claim 4, wherein the controller is configured to control the motor torque to maintain the speed of the engine above the predetermined stall speed.

6. A vehicle as set forth in claim 1, wherein the controller is configured to control the engine to maintain a speed that meets a driver request.

7. A vehicle as set forth in claim 1, wherein the controller is configured to prevent the engine flare during the manual actuation of the clutch assembly by controlling the engine torque to prevent the engine flare.

8. A vehicle as set forth in claim 1, wherein the controller is configured to control a speed of the engine based at least in part on a speed of the input shaft while the clutch assembly is at least partially engaged.

9. A vehicle as set forth in claim 1, wherein the engine and the motor are configured to provide torque to a crankshaft, and wherein the controller is configured to control the torques provided by the engine and the motor to the crankshaft.

10. A vehicle as set forth in claim 9, wherein the clutch assembly is operatively disposed on the crankshaft and the input shaft of the transmission to transfer torque from at least one of the engine and motor to the transmission.

11. A vehicle as set forth in claim 1, further comprising an input sensor configured to measure a speed of the input shaft.

12. A vehicle as set forth in claim 11, wherein the controller is configured to control a speed of the engine based at least in part on the speed of the input shaft.

13. A vehicle as set forth in claim 11, wherein the controller is configured to identify at least one of an upshift and a downshift based at least in part on a change in the speed of the input shaft.

14. A method of preventing at least one of engine stall and excessive engine flare in a vehicle having a transmission with an input shaft, an engine having a crankshaft that provides an engine torque to the input shaft, a motor, an accelerator pedal, a clutch pedal, and a controller, the method comprising:
receiving, via the controller:
a vehicle speed;
a position of the clutch pedal;
a position of the accelerator pedal; and
a gear selection;
determining a desired crankshaft torque from the vehicle speed, the position of the accelerator pedal, the clutch pedal position, and the gear selection, wherein the desired crankshaft torque is sufficient to prevent engine stall during manual actuation of a clutch assembly by a driver of the vehicle;
detecting an engagement of the clutch assembly using the determined clutch pedal position; and
commanding, via the controller, each of an engine and a motor to provide at least a portion of the desired crankshaft torque during actuation of the clutch assembly by the driver, to synchronize a rotational speed of the crankshaft with a rotational speed of the input shaft and thereby reduce slip across the clutch assembly during the engagement of the clutch assembly, and to prevent engine stall and engine flare during the manual actuation of the clutch assembly.

15. A method as set forth in claim 14, further comprising: determining the desired crankshaft torque is based at least in part on the clutch pedal position.

16. A method as set forth in claim 14, further comprising determining a desired engine torque and a desired motor torque based at least in part on the desired crankshaft torque.

17. A method as set forth in claim 16, wherein determining the desired engine torque and the desired motor torque is further based at least in part on a vehicle constraint.

18. A method as set forth in claim 17, wherein the vehicle constraints include an anti-flare speed limit, an anti-stall speed limit, a motor torque speed limit, an engine torque speed limit, and a battery power limit.

* * * * *